(12) United States Patent
Medina (10) Patent No.: US 11,182,467 B1
(45) Date of Patent: Nov. 23, 2021

(54) NON FUNGIBLE TOKEN DISPLAY SYSTEM AND METHOD

(71) Applicant: Damian Medina, Aliso Viejo, CA (US)

(72) Inventor: Damian Medina, Aliso Viejo, CA (US)

( * ) Notice: Subject to any disclaimer, the term of this patent is extended or adjusted under 35 U.S.C. 154(b) by 0 days.

(21) Appl. No.: 17/206,302

(22) Filed: Mar. 19, 2021

(51) Int. Cl.
| | |
|---|---|
| *G06F 7/04* | (2006.01) |
| *G06F 21/36* | (2013.01) |
| *G06F 3/147* | (2006.01) |
| *G06K 7/14* | (2006.01) |

(52) U.S. Cl.
CPC .............. *G06F 21/36* (2013.01); *G06F 3/147* (2013.01); *G06K 7/1417* (2013.01)

(58) Field of Classification Search
CPC ........ G06F 21/36; G06F 3/147; G06K 7/1417
See application file for complete search history.

(56) References Cited

U.S. PATENT DOCUMENTS

| | | |
|---|---|---|
| 8,896,611 B2 | 11/2014 | Tang et al. |
| 9,862,222 B1 | 1/2018 | Nagelberg et al. |
| 9,972,239 B2 | 5/2018 | Trachtenberg et al. |
| 10,269,323 B2 | 4/2019 | Trachtenberg et al. |
| 10,361,866 B1 | 7/2019 | McGregor et al. |
| 10,505,726 B1 * | 12/2019 | Andon ................. G06Q 30/016 |
| 10,532,268 B2 | 1/2020 | Tran et al. |
| 10,789,590 B2 | 9/2020 | Tran et al. |
| 2011/0238497 A1 * | 9/2011 | Milne ................. G06Q 30/0251 705/14.49 |
| 2013/0325525 A1 * | 12/2013 | Boyd, Jr. ............... G06Q 10/02 705/5 |
| 2018/0134492 A1 * | 5/2018 | Lert, Jr. ............... B65G 1/0492 |
| 2019/0035208 A1 * | 1/2019 | Simons ................ G07F 17/3223 |
| 2020/0005284 A1 * | 1/2020 | Vijayan ................ G06Q 20/02 |
| 2020/0273048 A1 * | 8/2020 | Andon ................ G06F 16/2379 |
| 2020/0328891 A1 * | 10/2020 | Drouot ................ G06F 16/2379 |
| 2021/0035246 A1 * | 2/2021 | Schouppe ............... H04L 63/12 |
| 2021/0103938 A1 * | 4/2021 | Bulawski ................ H04W 4/80 |

OTHER PUBLICATIONS

Website Content and Screenshots: Tokencast.net. PDF screenshots from: https://tokencast.net/, retrieved Mar. 18, 2021.

* cited by examiner

*Primary Examiner* — Thien M Le (57) ABSTRACT

Disclosed herein is novel system and method for connecting an NFT digital asset collection for secure display on a feature-rich video display system commensurate with the quality and value of the NFT assets. An exemplary embodiment comprises a system involving a software application that registers one or more secure video displays, accesses by way of owner authorization an NFT digital asset collection or archive, and facilitates displaying the assets on a feature-rich high quality display system.

16 Claims, 9 Drawing Sheets

NON FUNGIBLE TOKEN DISPLAY SYSTEM AND METHOD

FIELD

The present invention relates to display systems and methods. More particularly, the present invention relates to systems and methods for coordinating the display of non-fungible-token digital assets onto registered displays.

BACKGROUND

Cryptoart is commonly describe as digital artwork that is published directly onto a blockchain in the form of a non-fungible-token (NFT), which makes the ownership, transfer, and sale of an artwork possible in a cryptographically secure and verifiable manner. Cryptoart can be considered one type of NFT digital asset, or digital content, that can be displayed visually, and audibly, on a video display.

Beyond visual and audio visual works that are considered "art" in the tradition sense, other types of NFT digital assets that can be displayed visually and audibly on a video display are also growing dramatically in popularity. These NFT digital assets include digital representations of sports memorabilia, and even sporting events, digital representations of collectable trading cards, and even a digital representation of a Twitter founder's first tweet message, to name a few.

A vigorous market has developed for the buying and selling of NFT digital assets. Individual market participants are trading in NFTs at prices ranging in the millions of US dollars. Although participants in this market are amassing enormous, extremely valuable NFT digital asset collections, there exists no well developed or elegant way of displaying and viewing these collections. Currently NFT assets reside in an owners "digital wallet" archive that conventionally only offers visibility of the asset at a "thumbnail" level. This is ironic and extremely dissatisfying in view of the value and nature of these NFT digital assets.

What is needed is a system and method for connecting an NFT digital asset collection for secure display on a feature-rich video display system commensurate with the quality and value of the NFT assets.

SUMMARY

An exemplary embodiment of the present invention comprises a system involving a software application that registers one or more secure video displays, accesses by way of owner authorization an NFT digital asset collection or archive, and facilitates displaying the assets on a feature-rich high quality display system.

An exemplary method consistent with the present invention comprises providing a first video display having a first unique identifier. The display is configured to receive and display NFT digital content. The NFT digital content is caused to be displayed by an associated software application. The associated software application establishes user authorized access to a user-owned NFT digital asset archive. The associated software application registers the video display based on the unique identifier, thereby authorizing the video display to receive and display the NFT digital content.

Another exemplary embodiment of the present invention comprises a non-transitory computer readable medium storing a program that, when executed by a computer processor, causes the computer processor to perform a method for displaying NFT digital assets. The method comprises registering through an associated software application a video display based upon a unique identifier associated with the video display. The video display is configured to receive and display NFT digital content that is caused to be displayed by the associated software application. The associated software application establishes user authorized access to a user-owned NFT digital asset archive.

BRIEF DESCRIPTION OF DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

So that the manner in which the features and advantages of embodiments of methods and systems of the present invention may be understood in more detail, a more particular description of the present invention briefly summarized above may be had by reference to certain embodiments thereof that are illustrated in the appended drawings, which form a part of this specification. The drawings illustrate only certain embodiments of the present invention and are, therefore, not to be considered limiting of the scope of the present invention which includes other useful and effective embodiments as well.

Figure 1A:
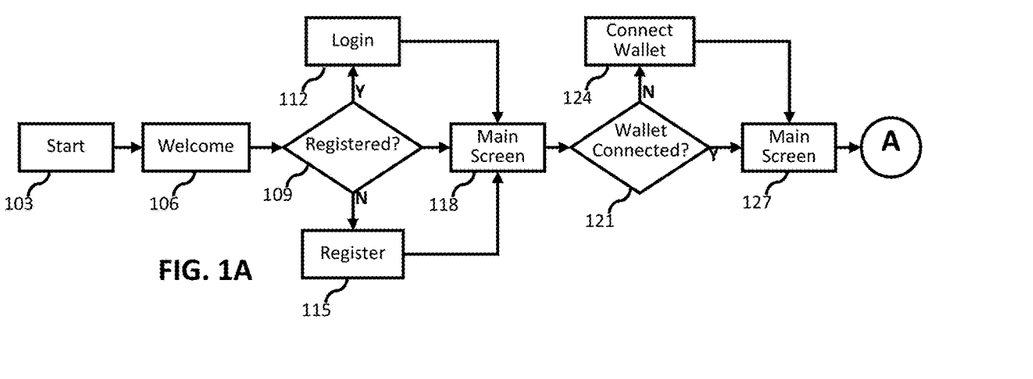
FIG. 1A is a flow diagram illustrating the function of a software application operating according to an embodiment of the present invention.
Figure 1B:
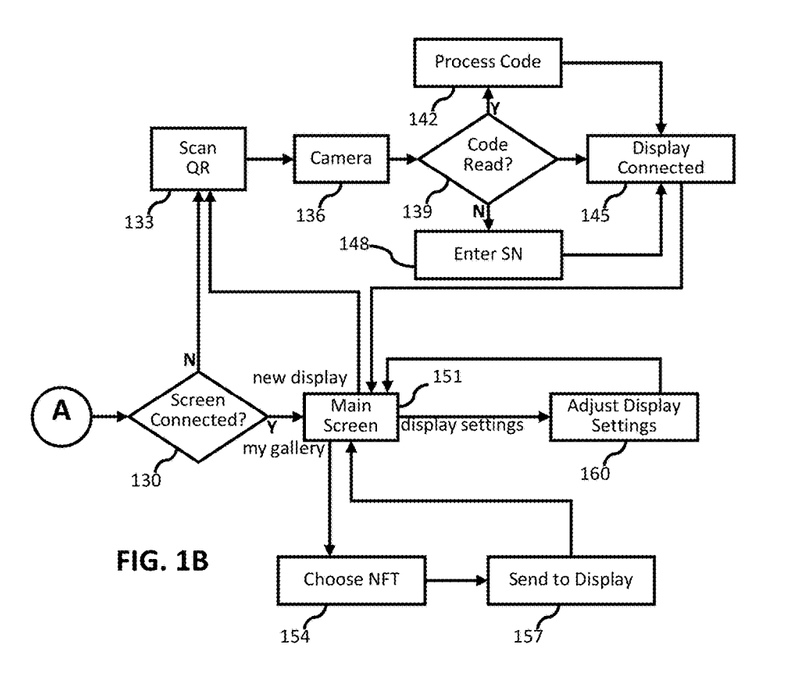
FIG. 1B is a flow diagram illustrating the function of a software application operating according to one embodiment of the present invention.

FIGS. 1A and 1B combine as a flow diagram illustrating the function of a software application operating according to an embodiment of the present invention. The software application is associated with the NFT display system and method according to this embodiment of the present invention. In this embodiment, the associated software application may reside on a portable handheld device, such as a smartphone. Alternative, in this embodiment, the associated software application my reside on the internet, accessed through a web browser operating on any device configured to run a web browser.

In this exemplary embodiment, this associated software application is central to the operation of the inventive system and method. Among other functions, as will be detailed further, the application registers video displays, thereby authorizing them to receive and display NFT digital content, and establishes user authorized access to user-owned NFT digital asset archives that can then be displayed on the displays.

More specifically, referring to FIG. 1A, the software application begins operation at step 103. At step 106 a welcome screen is presented to the user. The user is queried at step 109 as to whether the user is already registered with the application. If the user is registered with the application, then the user logs into the application at step 112. If the user is not registered with the application, then the user registers for the first time at step 115. After the user registers or logs in, the application proceeds to display a main screen at step 118.

At step 121, the user is queried as to whether user authorized access has already been established with the user's NFT digital asset archive. This archive is sometimes referred to as a digital wallet. If access has not yet been established, then the user inputs authorization credentials at step 124, thereby establishing secure access to the user's NFT asset archive by the software application.

There are a variety of types of NFT digital assets that may be stored in the user-owned archive (wallet). In certain embodiments those assets comprise any or all of digital image content, digital audio content, digital video content, combination digital image and digital audio content, and combination digital video and digital audio content. Once access is established to the user-owned digital archive, the software application returns to the main screen at step 127.

Turning to FIG. 1B, at step 130 the user is queried as to whether a video display has been previously registered by the software application to securely display user-owned NFT digital content. If no display has been registered, then at step 133 the software application initiates the display screen registration process. According to this exemplary embodiment of the present invention, the software application attempts to register a system video display using a quick response (QR) barcode affixed to the display. More specifically, at step 136 the software application accesses a camera. In this embodiment, the camera is a camera integrated into the smartphone that hosts the software application. At step 139, if the QR code is properly read, then at step 142 the code is processed and at step 145 the display is registered and connected as authorized for the system. If, at step 139 the QR code cannot be properly read, then at step 148 the user is instructed to manually input a serial number associated with the display. Once the serial number is entered, then at step 145 the display is registered and connected as authorized for the system.

Once at least one display is properly registered, and access has been established to at least one user-owned NFT digital asset archive, then the software application returns to the main screen at step 151. At step 151 the main screen provides the option of registering an additional display. If that option is selected, then the software application proceeds to step 133, as previously described.

Also at step 151, the main screen provides the option of facilitating the user's selection of a user-owned NFT digital asset for display on a registered video display. If the user selects this option, at step 154 the user is presented with visual representations of a plurality of the user-owned NFT digital assets. The user can select one or more of the assets for display on one or more registered displays. At step 157 the user selects which display or displays will display the selected NFT digital asset. And at step 157 the NFT digital content is displayed accordingly.

Returning to step 151, also at step 151 the user is presented with the option to adjust video display settings of any of the registered displays. If the user selects this option, then at step 160 display options are presented to the user for adjustment. In this embodiment of the present invention, the display options include volume, brightness, and on-off times that can be scheduled according to daily schedules, sleep schedules, away from the home schedules, power saving preferences, and the like. The settings for each different registered display may be adjusted independently by way of steps 151 and 157.

Figure 2:
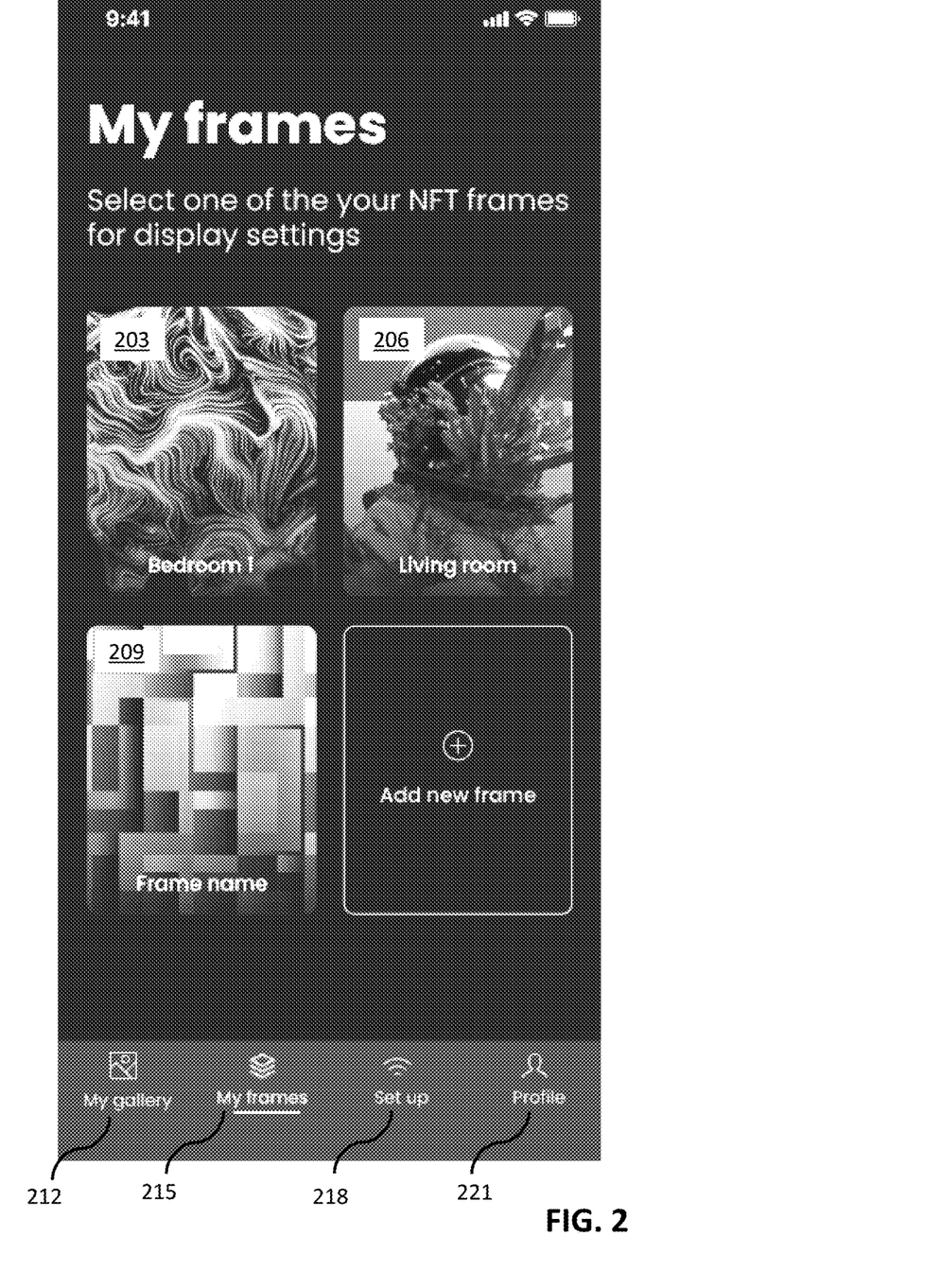
FIG. 2 illustrates the screen of a controller device displaying visual representations of digital content displayed on a plurality video displays, according to one embodiment of the present invention.

Turning now to FIG. 2, FIG. 2 illustrates one screen of the software application displayed on a controller device such as a smartphone, according to one embodiment of the present invention. More specifically, FIG. 2 illustrates visual representations, 203, 206, and 209 of user-owned NFT digital assets which are currently being displayed on registered displays located in three separate rooms of a user's residence. The screen of FIG. 2 thereby also presents a menu of available displays.

Each of the visual representations 203, 206 and 209 may be tapped, such tap causing the software application to facilitate the user adjusting that display's settings as described with reference to step 160 of FIG. 1B, and also to facilitate the user selecting a different NFT digital asset for display on that particular registered display as described with reference to step 154 of FIG. 1B.

Also available on the screen of FIG. 2 are icons 212, 215, 218 and 221. When icon 212, labeled My gallery in this embodiment, is tapped, the software application arrives at step 154 of FIG. 1B (and also the screen of FIG. 3, described below), permitting the user to select alternative NFT digital assets for display. When icon 215, labeled My Frames in this embodiment, is tapped, the screen of FIG. 2 is presented offering the function options as described above. When icon 218, labeled Set up in this embodiment, is tapped, the software application arrives at step 133 or FIG. 1B which facilitates setting up a new video display or reestablishing setup of a display that may have been disconnected. When icon 221, labeled Profile, is tapped, the software application provides options to modify user information such as email address, password, NFT digital archive access settings, and the like.

Figure 3:
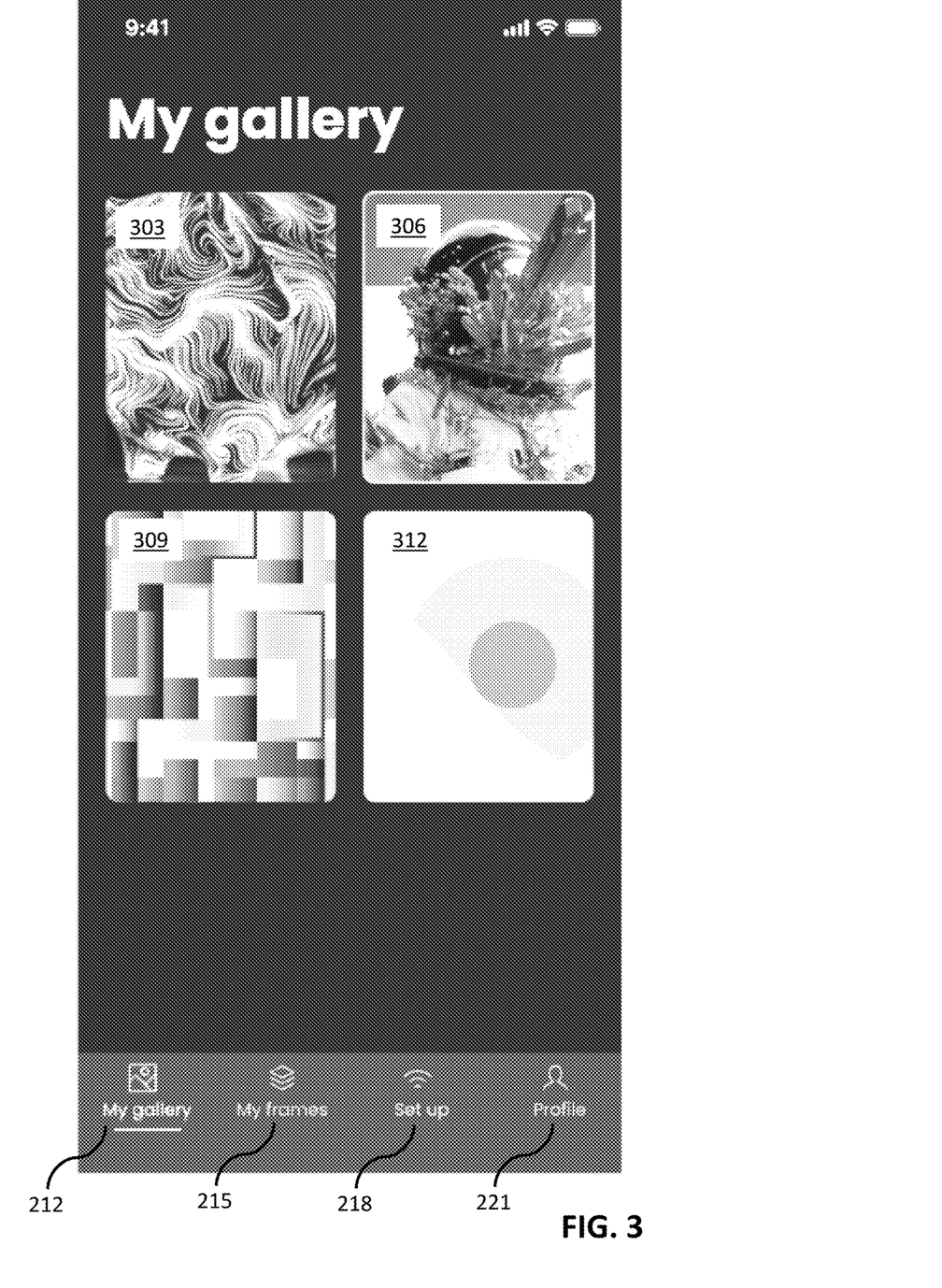
FIG. 3 illustrates the screen of a controller device displaying user-owned NFT digital assets, according to one embodiment of the present invention.

Turning to FIG. 3, FIG. 3 illustrates another screen of the software application displayed on a controller device such as a smartphone, according to one embodiment of the present invention. FIG. 3 provides visual representations 303, 306, 309 and 312 of user-owned NFT digital assets that can be displayed on registered video displays as digital content. In this embodiment, these digital assets can comprise a variety of different types of digital content. These types include digital image content, digital audio content, digital video content, combination digital image and digital audio content, and combination digital video and digital audio content. A user can tap the image of an NFT asset and subsequently select a registered display for its display.

Figure 4:
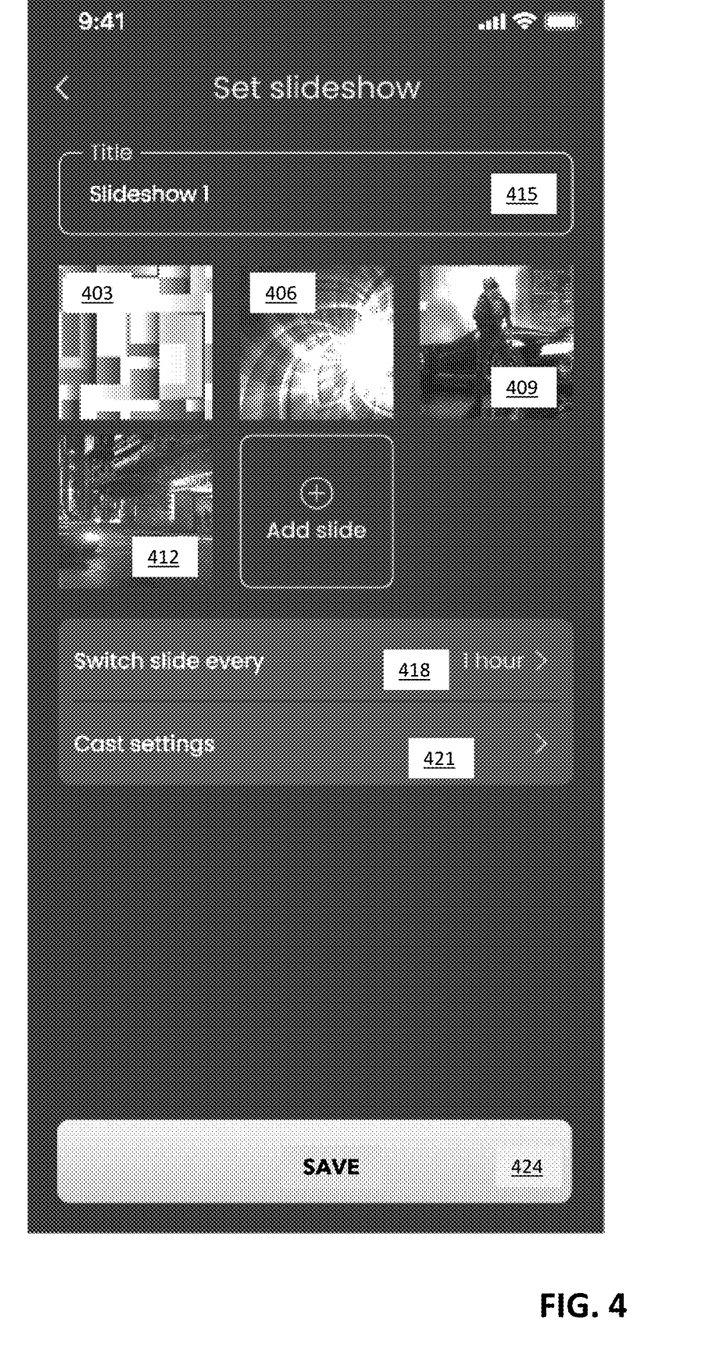
FIG. 4 illustrates the screen of a controller device displaying a slideshow creation screen, according to one embodiment of the present invention.

Turning to FIG. 4, FIG. 4 illustrates another screen of the software application displayed on a controller device such as a smartphone, according to one embodiment of the present invention. Specifically, FIG. 4 illustrates a slideshow creation screen. Thumbnail images 403, 406, 409 and 412 are visual representations of use-owned NFT digital assets that a user has selected for including in a slideshow that will be displayed on a user selected registered video display. Field 415 is a field in which a user can type a title designating this slideshow. Also illustrated are buttons 418, 421 and 424. Tapping button 418 offers options for a user to select how quickly the designated registered display will transition from one NFT digital asset in the slideshow to the next. Button 421 offers options for a user to move to step 160 of FIG. 1B which facilitates, for the slideshow being created, setting video display settings such as volume, brightness, and on-off times that can be scheduled according to daily schedules, sleep schedules, away from the home schedules, power saving preferences, and the like. Button 424 allows a user to save all settings and NFT digital asset selections for this slideshow.

Figure 5:
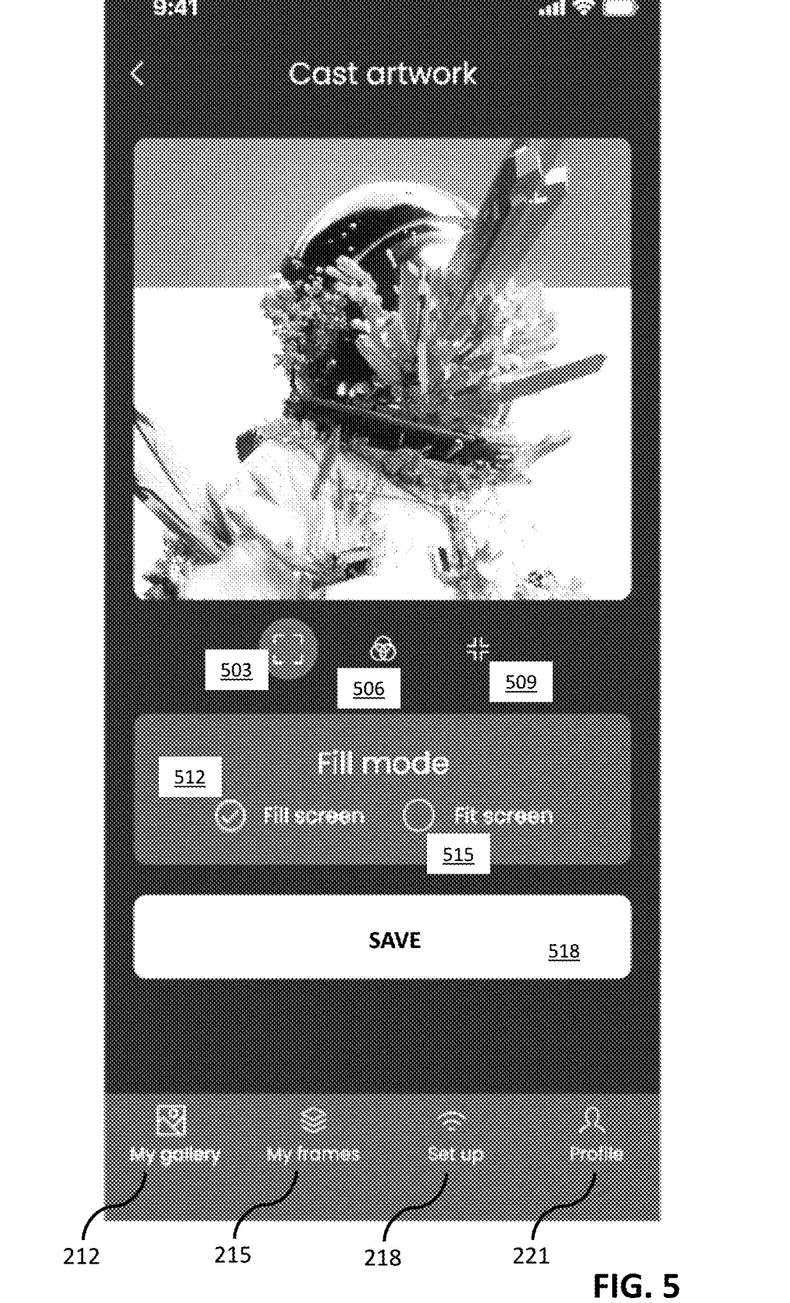
FIG. 5 illustrates the screen of a controller device displaying a display mode selection for displaying NFT digital content on a video display, according to one embodiment of the present invention.

Turning to FIG. 5, FIG. 5 illustrates the screen of a controller device displaying a display mode selection for displaying NFT digital content on a video display, according to one embodiment of the present invention. Indicator icons 503, 506, and 509 are shown on FIG. 5. Indicator icon 503, 506, and 509 are associated with the functions represented in FIGS. 5, 6, and 7 respectively. Tapping an indicator icon produces a highlight halo behind the icon (the lighter circle shown behind icon 503 in FIG. 5), and activates the respective screen and function choices associates with that indicator icon, as will be describe in more detail with reference to FIGS. 5, 6, and 7.

Referring to FIG. 5, FIG. 5 is a software application screen according to this exemplary embodiment that allows the user to select, for any giving user-owned NFT digital asset, whether it will be displayed on a registered display so as to fully fill the screen dimensions of the registered display (also referred to as Fill Mode), or alternatively whether the asset will be displayed in the asset's original aspect ratio, which may not match the aspect ratio of the registered display. If the fully fill mode is not chosen and the aspect ratio of the asset and the display do not match, then a boarder area will appear on the display, surrounding the asset, as described below with reference to FIGS. 6 and 7. Selection of fully fill mode, or deselection of fully fill mode is accomplished in this embodiment by tapping buttons 512 or 515, respectively. The selected setting is saved by tapping save button 518.

Figure 6:
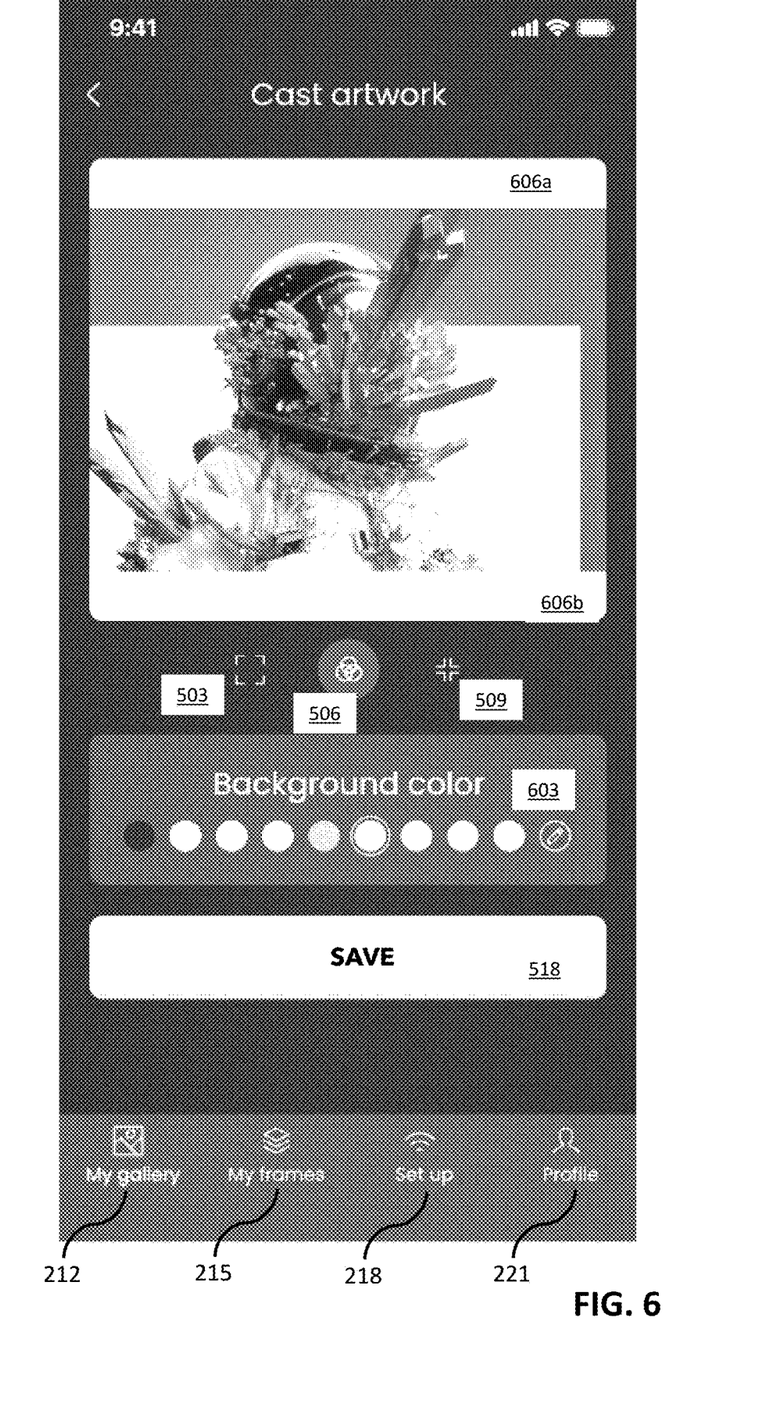
FIG. 6 illustrates the screen of a controller device displaying a display mode selection for displaying NFT digital content on a video display, according to one embodiment of the present invention.

Turning to FIG. 6, when indicator icon 506 is tapped, a halo appears behind icon 506 and the screen of FIG. 6 is presented by the software application. The screen of FIG. 6 facilitates the user selecting a color for the portion of the registered display screen that surrounds the displayed NFT digital content (also referred to as the Background Color selection). The color is selected by tapping the preferred color button of button series 603. The selected color will appear on the registered display as visually represented by regions 606a and 606b surrounding the NFT digital asset. The color selection is saved by tapping save button 518.

Figure 7:
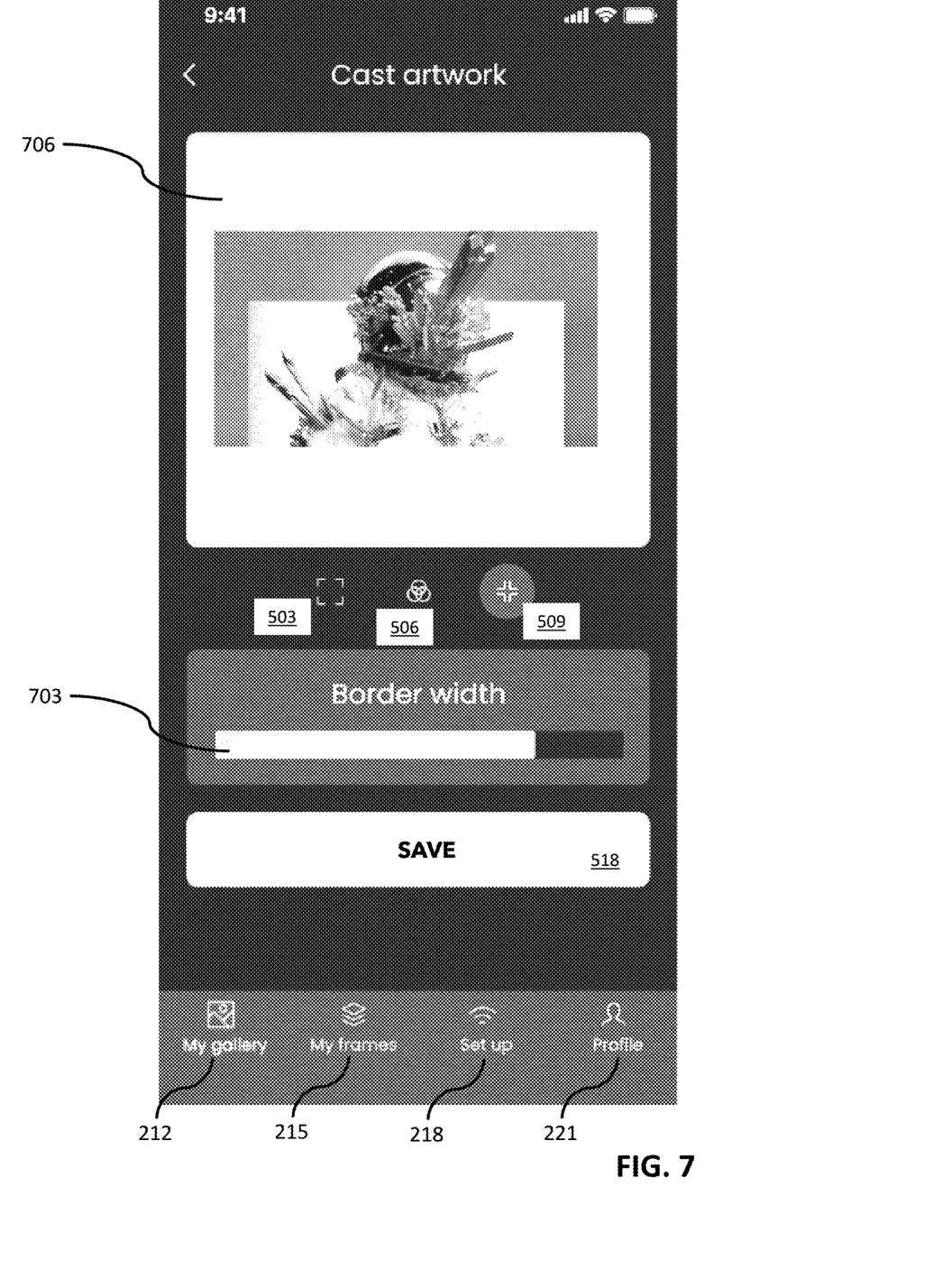
FIG. 7 illustrates the screen of a controller device displaying a display mode selection for displaying NFT digital content on a video display, according to one embodiment of the present invention.

Turning to FIG. 7, when indicator icon 509 is tapped, a halo appears behind icon 509 and the screen of FIG. 7 is presented by the software application. The screen of FIG. 7 facilitates the user selecting the size of a border region that surrounds the displayed NFT digital content (also referred to as the Boarder Width selection). The border size is selected by sliding the boarder width bar 703 to the left to decrease the border size, and to the right to increase the border size. The size formatted border will appear on the registered display as visually represented by region 706 surrounding the NFT digital asset. The border size selection is saved by tapping save button 518.

In addition to the functions illustrated in FIGS. 5, 6 and 7, other digital content display modes and adjustments may be offered in other exemplary embodiments. For example, a function facilitating rotating the displayed image may be offered, for example rotating the image ninety degrees in the clockwise or counterclockwise direction. Additionally, a flip function may be offered, facilitating reversing the image relative to its horizontal or vertical axis.

Figure 8:
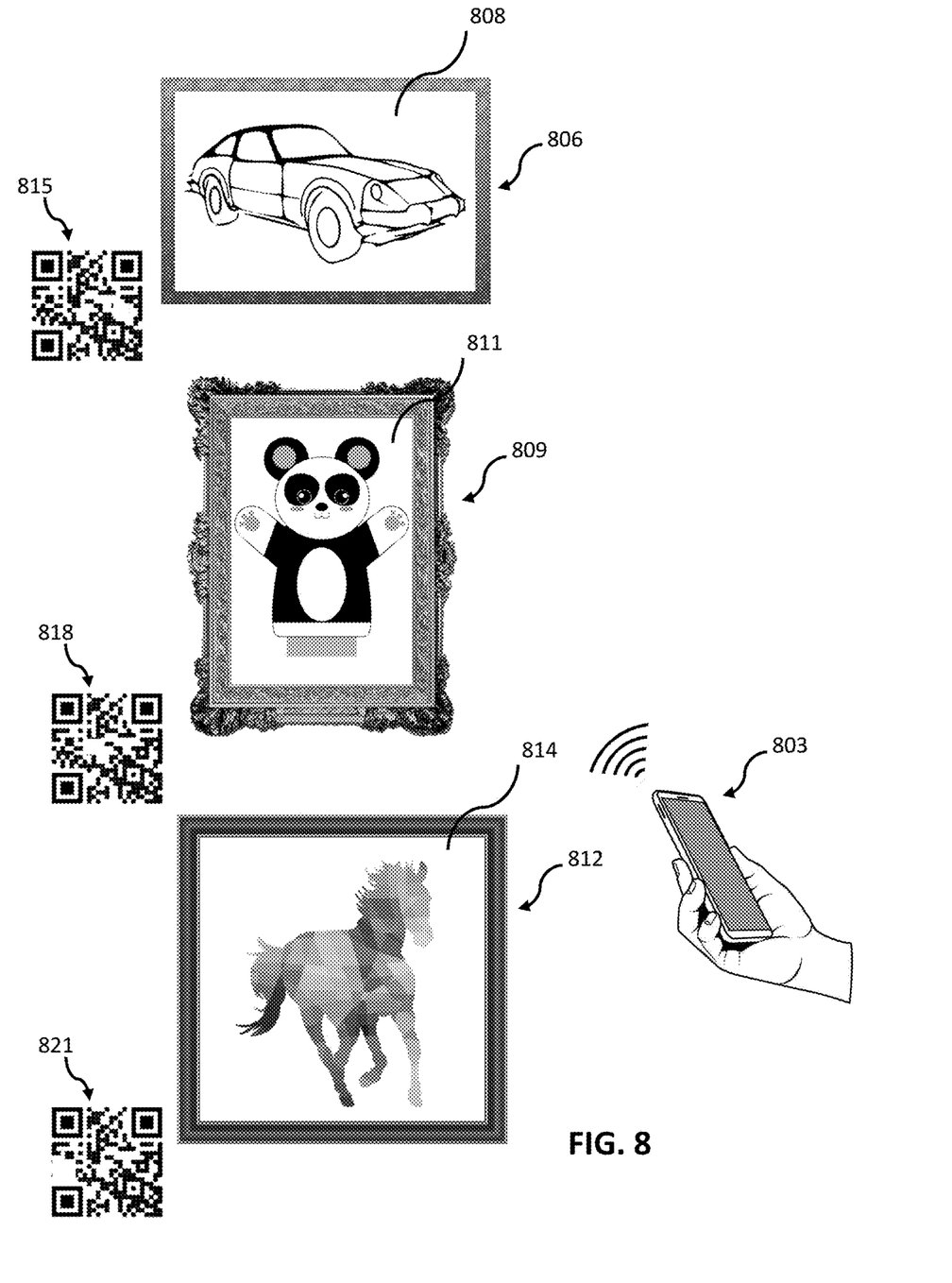
FIG. 8 illustrates a plurality of video displays controlled by an associated software application operating on a mobile device, the displays displaying respective NFT digital content, according to one embodiment of the present invention.

Turning to FIG. 8, FIG. 8 illustrates a plurality of video displays controlled by an associated software application operating on a mobile device, the displays displaying respective NFT digital content, according to one embodiment of the present invention. More specifically, FIG. 8 illustrates controller device 803. In this embodiment, controller device 802 in a portable computing device, in particular a smartphone. According to this exemplary embodiment, portable computing device 802 may alternatively be a tablet or ruggedized handhold computer. In this exemplary embodiment, the software application associated with the system resides on controller 803.

FIG. 8 further illustrates video displays 806, 809 and 812. A system according to this embodiment of the present invention may comprise from one to any number of displays. In this exemplary embodiment, displays 806, 809 and 912 each have a surrounding bezel that appears as a traditional picture frame. This formfactor is especially appealing to those who intend to display Cryptoart NFT digital assets.

Referring to FIG. 8, video displays 806, 809, and 812 display digital content 808, 811 and 814, respectively, associated with individual user-owned NFT digital assets. In this exemplary embodiment, digital content 808, 811, and 814 can comprise any or all of digital image content, digital audio content, digital video content, combination digital image and digital audio content, and combination digital video and digital audio content.

Each display 806, 809 and 812 has an associated unique identifier. In this exemplary embodiment the respective unique identifiers are coded into quick response (QR) barcodes 815, 818 and 821. In this embodiment the QR codes are displayed on the screen of the video display when the display is powered on, accessible for scanning by a camera element of controller 803. Associated human readable serial numbers are displayed on the screen below the QR code. As described with reference to steps 133, 136, 139, 142, 145 and 148 of FIG. 1B, the software application registers a video display by scanning the QR code associated with the particular display, thereby authorizing the display to receive and display user-owned NFT digital content associated with user-owned NFT digital assets. If the QR code cannot be read, the user can manually enter the associated serial number to complete the registration.

In the embodiment illustrated in FIG. 8, video displays are shown in a variety of frame formats. More specifically, video display 806 has a landscape format. Video display 809 has a portrait format. And video display 812 has a square format having all four sides substantially equal in length. This variety of formats offers flexibility to a user for selecting video displays that are particularly suited for the user's particular NFT digital asset digital content. Although square video displays are unconventional, popular NFT digital assets are often square-shaped when displayed visually. Therefore, the square format of display 812 may be particularly desirable.

In certain exemplary embodiments, the video displays comprise an integral swivel mount (not shown), attached to the back of the display. The swivel mount facilitates rotating the video display (frame) ninety degrees, for example, to change its orientation from landscape to portrait, or visa versa. In certain embodiments, the inventive system detects the change in orientation, and adjusts the digital content currently being displayed accordingly. In certain embodiments, all current orientations and changes in orientation are reflected in the user interface of the associated software application, for example on the screens of FIGS. 5, 6 and 7.

Figure 9:
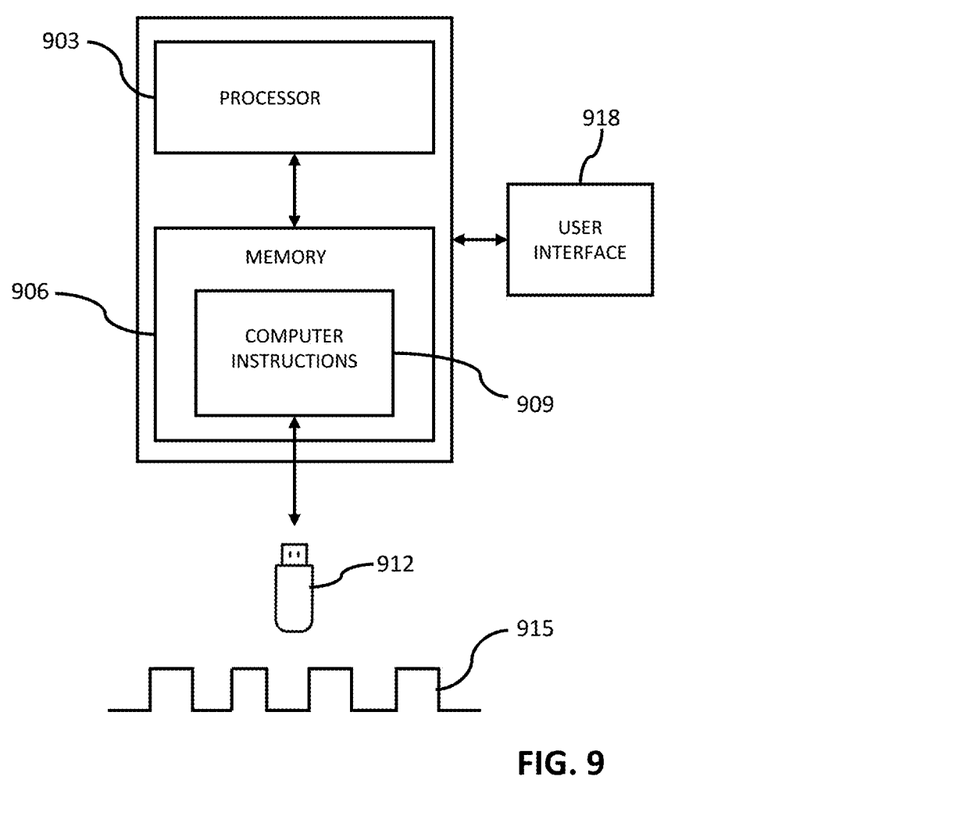
FIG. 9 is a block diagram illustrating a non-transitory computer readable medium storing a program that, when executed by a computer processor, causes the computer processor to perform a method for displaying non-fungible-token digital assets, according to one embodiment of the present invention.

Turning for FIG. 9, FIG. 9 is a block diagram illustrating a non-transitory computer readable medium storing a program that, when executed by a computer processor, causes the computer processor to perform a method for displaying non-fungible-token digital assets, according to one embodiment of the present invention. More specifically, FIG. 9 illustrated processor 903, memory 906, computer instructions 909, computer readable storage medium 912, computer readable digital signal 915, and user interface 918.

In an exemplary embodiment of the present invention processor 903 is a computer processor residing in controller 803 (FIG. 8). Computer instructions 909 are the computer instruction that, when executed by processor 909, serve as the system software application. Computer instructions 909 reside in memory 906, which is computer memory that resides in controller 803. Computer instructions 909 may be read from computer readable storage medium 912 or computer readable digital signal 915 by processor 903 and stored by processor 903 permanently, semi-permanently, or temporarily, in memory 906. In this exemplary embodiment, computer readable storage medium 912 comprises a flash memory stick.

User interface 918 includes the screens of FIGS. 2, 3, 4, 5, 6 and 7 presented to the user for operation of the system, as well as many other user interface screens as may suit the particular embodiment. In this preferred embodiment, computer interface 918 provides access to the functionality of the software application by way of a touchscreen interface of controller 803.

According to the foregoing, an inventive and novel system and method for connecting an NFT digital asset collection for secure display on a feature-rich video display system commensurate with the quality and value of the NFT assets is described. An exemplary embodiment of the present invention comprises a system involving a software application that registers one or more secure video displays, accesses by way of owner authorization an NFT digital asset collection or archive, and facilitates displaying the assets on a feature-rich high quality display system.

Some portions of this description describe the embodiments of the invention in terms of algorithms. These operations, while described functionally, computationally, or logically, are understood to be implemented by computer programs or equivalent electrical circuits, micro-code, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to herein may include a single processor or may be implemented with architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as database management. These devices can also include other electronic devices, such as dummy terminals, virtual terminals, thin-clients, and other devices capable of communicating via a network.

Embodiments can utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, or any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python, or TCL, as well as combinations thereof. The server(s) may also include database servers, including without limitation those commercially available from Oracle®, Microsoft®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element, or keypad) and at least one output device (e.g., a display screen, a display device, printer, or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed, and/or removable storage devices as well as storage media for temporarily and/or more permanently containing, storing, transmitting, and retrieving computer-readable information. The system and various devices also can include a number of software applications, modules, services, or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets, APIs, scripts, and the like), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments and that many modifications and variations are possible.

The foregoing description of the embodiments of the invention has been presented for the purpose of illustration; it is not intended to be exhaustive or to limit the invention to the precise forms disclosed. The description and drawings are, accordingly, to be regarded in an illustrative rather than a restrictive sense. The language used in the specification has been principally selected for readability and instructional purposes. It is therefore intended that the scope of the invention be limited not by this detailed description and drawings, but rather by any claims that issue based on this application. It will, however, be evident that various modifications and changes may be made thereunto without departing from the broader spirit and scope of the invention as set forth in the claims.

What is claimed is:

1. A method for displaying non-fungible-token digital assets comprising the steps of:
   providing a first video display comprising a first unique identifier and configured to receive and display non-fungible-token digital content that is caused to be displayed by an associated software application;
   establishing through the associated software application user authorized access to a user-owned non-fungible-token digital asset archive;
   registering through the associated software application the first video display based on the unique identifier, thereby authorizing the first video display to receive and display the non-fungible-token digital content;
   providing at least a second video display comprising a second unique identifier registered by the associated software application, the second video display configured to receive non-fungible-token digital content that is caused to be displayed by the associated software application; and
   displaying on a controller a menu of available displays selectable by a user, whereby the user can cause displaying a first non-fungible-token digital asset on a first selected available display and cause displaying a second non-fungible-token digital asset on a second selected available display.

2. The method of claim 1, wherein the non-fungible-token based digital content is selected from the group consisting of digital image content, digital audio content, digital video content, combination digital image and digital audio content, and combination digital video and digital audio content.

3. The method of claim 1, wherein the step of registering comprises scanning a first quick response code representing the first unique identifier.

4. The method of claim 1, wherein the step of providing the first video display comprises providing a square-shaped video display having four sides substantially equal in length.

5. The method of claim 1, wherein the associated software application is configured to reside on portable computing device.

6. The method of claim 1, wherein the associated software application is configured to reside on the internet, accessible by an authorized user through a web browser.

7. A display system comprising:
   a first video display comprising a first unique identifier and configured to receive and display non-fungible-token digital content that is caused to be displayed by an associated software application;
   wherein the associated software application registers the first video display based on the unique identifier, thereby authorizing the first video display to receive and display the non-fungible-token based digital content; and
   at least a second video display comprising a second unique identifier registered by the associated software application, the second video display configured to receive and display non-fungible-token digital content that is caused to be displayed by the associated software application, wherein the associated software application is configured to display on a controller a menu of available displays selectable by a user, whereby the user can cause displaying a first non-fungible-token digital asset on a first selected available display and cause displaying a second non-fungible-token digital asset on a second selected available display.

8. The display system of claim 7, wherein the non-fungible-token based digital content is selected from the group consisting of digital image content, digital audio content, digital video content, combination digital image and digital audio content, and combination digital video and digital audio content.

9. The display system of claim 7, wherein the associated software application is configured to establish user authorized access to a user-owned non-fungible-token digital asset archive.

10. The display system of claim 7, wherein the associated software application is configured to register the first video display by facilitating scanning a first quick response code representing the first unique identifier.

11. The display system of claim 7, wherein the first video display is square-shaped having four sides substantially equal in length.

12. The display system of claim 7, wherein the associated software application is configured to reside on a portable computing device.

13. The display system of claim 7, wherein the associated software application is configured to reside on the internet, accessible by an authorized user through a web browser.

14. A non-transitory computer readable medium storing a program that, when executed by a computer processor, causes the computer processor to perform a method for displaying non-fungible-token digital assets, the method comprising:

registering through an associated software application a first video display base upon a first unique identifier associated with the first video display, the first video display configured to receive and display non-fungible-token digital content that is caused to be displayed by the associated software application;

establishing through the associated software application user authorized access to a user-owned non-fungible-token digital asset archive;

registering through the associated software application a second video display base upon a second unique identifier associated with the second video display, the second video display configured to receive and display non-fungible-token digital content that is caused to be displayed by the associated software application; and displaying on a controller device by the associated software application respective visual representations of digital content being displayed on the first video display and the second video display.

15. A method for displaying non-fungible-token digital assets comprising the steps of:

providing a first video display comprising a first unique identifier and configured to receive and display non-fungible-token digital content that is caused to be displayed by an associated software application;

establishing through the associated software application user authorized access to a user-owned non-fungible-token digital asset archive;

registering through the associated software application the first video display based on the unique identifier, thereby authorizing the first video display to receive and display the non-fungible-token digital content;

providing a second video display comprising a second unique identifier registered by the associated software application, the second video display configured to receive non-fungible-token digital content that is caused to be displayed by the associated software application; and displaying on a controller device by the associated software application respective visual representations of digital content being displayed on the first video display and the second video display.

16. A display system comprising:

a first video display comprising a first unique identifier and configured to receive and display non-fungible-token digital content that is caused to be displayed by an associated software application;

wherein the associated software application registers the first video display based on the unique identifier, thereby authorizing the first video display to receive and display the non-fungible-token based digital content; and at least a second video display comprising a second unique identifier registered by the associated software application, the second video display configured to receive and display non-fungible-token digital content that is caused to be displayed by the associated software application, wherein the associated software application is configured to display on a controller device respective visual representations of digital content being displayed on the first video display and the second video display.

* * * * *